No. 771,246. PATENTED OCT. 4, 1904.
A. W. HENSHAW.
ALTERNATING CURRENT MOTOR.
APPLICATION FILED FEB. 11, 1903.
NO MODEL.
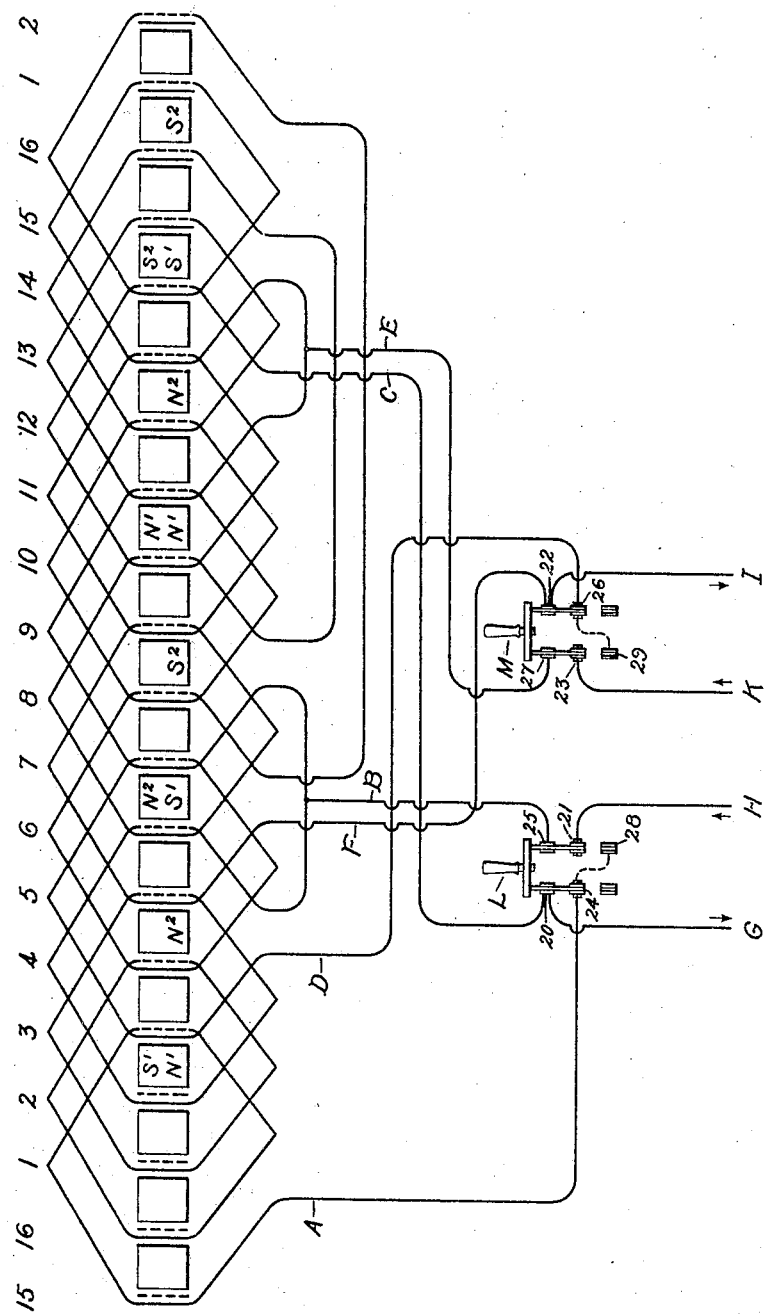
Witnesses.
George W. Tilden.
Helen Alford.
Inventor.
Arthur W Henshaw.
by Albert G. Davis
Att'y.

No. 771,246.

Patented October 4, 1904.

UNITED STATES PATENT OFFICE.

ARTHUR W. HENSHAW, OF SCHENECTADY, NEW YORK, ASSIGNOR TO GENERAL ELECTRIC COMPANY, A CORPORATION OF NEW YORK.

ALTERNATING-CURRENT MOTOR.

SPECIFICATION forming part of Letters Patent No. 771,246, dated October 4, 1904.

Application filed February 11, 1903. Serial No. 142,944. (No model.)

*To all whom it may concern:*

Be it known that I, ARTHUR W. HENSHAW, a citizen of the United States, residing at Schenectady, county of Schenectady, State of New York, have invented certain new and useful Improvements in Alternating-Current Motors, of which the following is a specification.

My invention relates to primary windings for alternating-current motors, and more particularly to that class of drum-windings in which the connections and arrangement of the conductors are such that the number of poles, and consequently the speed of rotation, may be readily altered by a simple change of coupling.

The winding which I have devised is for a two-phase motor and is adapted to give two speeds of rotation, according to the manner of coupling. In one arrangement of coupling the number of poles is one-half that of the other, and consequently the speed is twice as great. It is well understood in the art that any desired variation in the number of poles of any motor may be obtained by winding the motor with a large number of electrically-independent coils, bringing the terminal connections of each coil to a controlling-switch, and varying the relative connections of the coils; but the complication involved in this arrangement is practically prohibitive, and consequently this arrangement has been little used, notwithstanding that the desirability of such motor control has been fully appreciated. Heretofore windings designed simply and practicably to alter the number of effective poles, and consequently the armature-speed in the particular ratio of two to one, have been used only in three-phase motors, and I believe myself to be the first to produce in a simple and practicable manner this particular speed ratio in a two-phase motor.

In attempting to apply the principle employed in the speed regulation of three-phase motors, a disclosure of which may be found in Patent No. 725,415, granted April 14, 1903, to Dahlander and Lindstrom, the difficulty is that the poles resulting from one phase are simply reversed by current of the other phase, and consequently there is no resulting displacement of magnetic field, but a simple reversal which will not produce rotation of the armature.

One object of my invention therefore is to devise a winding which will produce for both arrangements of coupling the necessary pole-displacement upon the passage of the different-phased currents.

An additional object is to devise a winding which will accomplish these results with a minimum number of terminals. Such a winding constitutes the subject-matter of this application and comprises generally two windings, one for each phase so coupled and arranged that by a change of coupling the number of poles may be correspondingly changed in the ratio of two to one, and the different magnetic effects due to the different phases will produce the necessary polar displacement and consequent armature rotation.

An embodiment of my invention is illustrated in the accompanying drawing, which is a diagram of the winding and connections applied to the developed surface of a slotted magnetic core.

Referring to the diagram, the developed magnetic structure is shown by a series of squares which indicate the projections of said structure, and the spaces between said squares represent the usual slots into which the various coils constituting the windings are placed. These coils are represented by single lines; but it is of course understood that they may be made up of a number of turns, and in such case the terminals shown and hereinafter referred to would constitute the terminals of such coil. In the machine to which I have shown my winding applied there are sixteen slots in the magnetic core, each of which is designated by a numeral directly above it. These numerals are located in a row just above the windings in the diagram. The characters G H designate the supply-wires of one phase and I K the supply-wires of the second phase. The wires G H lead to contacts 20 and 21 of the double-pole double-throw switch L and the wires I K to corresponding contacts 22 23 of the similar switch M. The end terminals A C of the first phase-winding are connected to the contacts 24 and 20 of the switch L, and the intermediate terminal B of said winding is connected to the contact 25 of said switch. The end terminals D and F of the second phase-winding are connected to similar contacts 26 and 22 of the switch M, while the intermediate terminal E of said winding is connected to the contact 27. The contacts 24 and 26 of the switches L and M are connected to contacts 28 and 29, respectively. By tracing the circuits of each of these phases it will be found that the intermediate terminals B and E divide the first and second phase-winding, respectively, into halves and that each slot contains conductors carrying currents of both phases. With the terminals coupled in the manner illustrated, which is the proper coupling for full speed of the motor, it will be found that current passing from the wire H to the terminal B through the switch L will divide and pass continuously in opposite directions, in a circular or peripheral sense, through the two branches of the first phase-winding, returning by way of the terminals A and C and the switch L to the wire G. If we trace one half of this winding, as that extending to the right of the terminal B, it will be seen that it passes up through the slot 7, down through the slot 11, up through 8, down through 12, up through 9, down through 13, up through 10, down through 14 to the end terminal C. The current passing through this half of the winding will therefore have a flow continuously in the same direction in a peripheral sense— namely, to the right. Similarly it will be found that the course of the current through the other half of the winding will be continuously to the left. By similarly tracing the course of the current of the second phase it will be seen that it passes from the wire K through the switch M to the intermediate terminal E, where it divides and passes through the halves of the second phase-winding to the end terminals D F, and thence to the switch M and the line I; but it will be noted that the windings of the second phase are so disposed that the direction of flow of the current, considered in a peripheral sense, is not continuously the same in each half of the winding, as is the case in the winding of the other phase, but that each half of the winding passes first from one side to the other of this intermediate terminal. For example, if we consider the branch leading to the right of the terminal E in the diagram it will be seen that the same passes up through the slot 13, down through the slot 1, up through the slot 14, down through the slot 2, which in a peripheral sense is in a direction to the right, and then returns to the left of the terminal E to the slot 8, through which it passes upward, thence down through the slot 4, up through 7, and down through 3, which in a peripheral sense is in a direction to the left. Similarly, in tracing the course of the current in that portion of this phase-winding extending to the left of the intermediate terminal E and terminating at F it will be found that in each half of said portion the current also flows in opposite directions in a peripheral sense. If we now consider the coupling of the terminals when the switches L and M are thrown down, so that the terminals are connected for half-speed, it will be seen that both the intermediate terminals B and E are open-circuited. The current then for the first phase, entering from the wire H, will pass into the winding at the terminal A, and thence through each of the coils of said winding continuously in the same direction, in a peripheral sense, to the terminal C, and thence to the wire G. On the other hand, the current for the second phase, entering from the wire K, will pass into the winding at the terminal D and thence up through the slot 3, down through 7, up through 4, down through 8, which in a peripheral sense is in a direction to the right, and thence up through slot 2, down through 14, up through 1, down through 13, which in a peripheral sense is to the left, then up through 11, down through 15, up through 12, down through 16, which is to the right, thence up through 10, down through 6, up through 9, down through 5, which is to the left, and finally through the terminal F to the wire I.

From the above it will be seen that the connections for the second phase-winding differ essentially from those for the first, and this is true for both switch positions. By this difference in connecting the windings I am enabled to get the desired polar displacement for both arrangements of coupling. By tracing the circuits of both of the phases it will be seen that for the position of the switches illustrated, assuming a certain instantaneous direction of current-flow, the center of a south pole will be located between the slots 2 and 3 and the center of a north pole between the slots 10 and 11 for the first phase. For the second phase the center of a north pole will be located between the slots 6 and 7 and the center of a south pole between the slots 14 and 15. These centers of polarity I have indicated by the letters N and S, with the exponents "1" and "2" for the first and second phases, respectively, and have shown them in the upper portions of the squares indicating the projections of the magnetic core for the upper or full-speed position of the switches, and by similar letters and exponents in the lower half of said squares I have indicated the position of the centers of polarity for the lower or half-speed position of the switches L and M. In each of these cases the field resulting from the second phase is properly displaced relative to the field resulting from the first phase, so as to produce the necessary rotation of the armature. It should be noted that in this particular embodiment of my invention only six terminals are necessary to enable the necessary couplings for speed variation to be made.

Although I have shown two double-throw double-pole switches for properly coupling the terminals, it is clear that any other suitable coupling means may be employed, and, although my invention is here applied to a specific machine, still it is clear that the same is capable of a broader use, and I therefore do not wish to be limited to this specific disclosure. Many changes and modifications may be made without departing from the spirit of my invention.

What I claim as new, and desire to secure by Letters Patent of the United States, is—

1. A two-phase motor having its primary coils permanently connected in two independent windings and so arranged that by a change of the coupling of said windings to the source of current the number of poles may be correspondingly changed.

2. A two-phase motor having its primary coils permanently connected in two independent windings and so arranged that by a change of the coupling of said windings to the source the number of poles may be changed in the ratio of two to one and the speed consequently doubled.

3. A two-phase motor having primary drum-windings, said windings being provided with end and intermediate terminals, the conductors of each phase of said winding being so associated with each other and with said terminals that by a change of the coupling of said terminals the number of poles of the motor will be changed in the ratio of two to one and the speed of the motor consequently doubled.

4. A two-phase motor having primary drum-windings with their free ends provided with terminals, said windings also being provided with other terminals so connected as to divide the windings into halves, the conductors of each phase being so overlapped and connected that by a change of the coupling of said terminals the number of poles of the motor will be changed in the ratio of two to one and the speed of the motor consequently doubled.

5. A two-phase motor having primary drum-windings with their free ends provided with terminals, said windings also being provided with other terminals so connected as to divide the windings into halves, the conductors of each phase being so disposed upon the magnetic core that each slot will contain conductors carrying currents of both phases and so connected that by a change of the coupling of said terminals the number of poles of the motor will be changed in the ratio of two to one and the speed of the motor consequently doubled.

6. A two-phase motor having primary drum-windings, each of said windings being provided with end terminals and an intermediate terminal so connected as to divide the winding into halves, the conductors of each phase being so disposed upon the magnetic core that each slot will contain conductors carrying currents of both phases and so connected that by a change of the coupling of said terminals the number of poles of the motor will be changed in the ratio of two to one and the speed of the motor consequently doubled.

7. A two-phase motor having two independent windings, each including one-half of the primary turns permanently connected in series, said windings being so arranged that by a change of the coupling of said windings to the source the number of poles of the motor will be changed.

8. A two-speed motor having two independent windings so arranged that the current in one part of each winding is in the same relative direction for both speeds of the motor and in another part is in relatively opposite directions for the two speeds, and means for changing the relative connections of the parts of each winding to the source without disturbing the relative connections of said parts to each other.

9. A two-phase motor having two independent windings so arranged that a relative reversal of current in one-half of each winding produces a change in the number of poles of the motor.

In witness whereof I have hereunto set my hand this 10th day of February, 1903.

ARTHUR W. HENSHAW.

Witnesses:
BENJAMIN B. HULL,
HELEN ORFORD.